United States Patent [19]
Lee et al.

[11] Patent Number: 5,224,552
[45] Date of Patent: * Jul. 6, 1993

[54] COUNTER-ROTATING TWIN SHAFT SYSTEM FOR GARDENING MACHINES

[76] Inventors: Kai S. Lee; Esther W. Lee, both of 5235 Raborn, Portage, Mich. 49009

[*] Notice: The portion of the term of this patent subsequent to Apr. 7, 2009 has been disclaimed.

[21] Appl. No.: 789,063

[22] Filed: Nov. 7, 1991

Related U.S. Application Data

[63] Continuation-in-part of Ser. No. 672,380, Mar. 20, 1991, Pat. No. 5,101,911.

[51] Int. Cl.⁵ .............................................. A01B 33/02
[52] U.S. Cl. .................................... 172/52; 172/113; 172/123; 37/250; 474/101; 474/150; 56/13.7; 74/665 GE
[58] Field of Search ................. 172/48, 35, 36, 49, 172/52, 57, 60, 42, 100, 112, 113, 114, 116, 118, 119, 121, 123; 37/249–252, 260, 261; 56/13.7, 10.4, 217, 320.2, 16.9; 74/665 GE, 397, 399; 474/101, 150

[56] References Cited

U.S. PATENT DOCUMENTS

| | | |
|---|---|---|
| 1,240,542 | 9/1917 | Cassell . |
| 2,513,186 | 6/1950 | Leaman . |
| 2,612,094 | 9/1952 | Drozinski . |
| 3,128,831 | 4/1964 | Arndt . |
| 4,018,105 | 4/1977 | Walker .......................... 74/665 GE |
| 4,343,366 | 8/1982 | Walker . |
| 4,402,366 | 9/1983 | Dankel . |
| 4,452,316 | 6/1984 | Edwards . |
| 4,481,757 | 11/1984 | Tsuchiya ............................ 56/16.9 |
| 4,483,400 | 11/1984 | Arndt . |
| 4,519,459 | 5/1985 | Reaume . |
| 4,620,599 | 11/1986 | Zinck . |
| 4,905,460 | 3/1990 | Toman . |
| 4,979,573 | 12/1990 | Williamson ........................ 172/112 |
| 5,048,617 | 9/1991 | Haven .................................. 172/42 |
| 5,101,911 | 4/1992 | Lee et al. ............................ 172/48 |

FOREIGN PATENT DOCUMENTS 1518471 7/1978 United Kingdom ................. 56/13.7

Primary Examiner—Randolph A. Reese
Assistant Examiner—Spencer Warwick
Attorney, Agent, or Firm—Flynn, Thiel, Boutell & Tanis

[57] ABSTRACT

A gardening utility machine having a counter-rotation twin shaft system can perform multiple types of work required for gardening (tilting, soil removal, weeding, racking and shredding of leaves), snow/ice removal and for power de-thatching and mowing of lawn grass. This can be done by exchanging attachments on the counter-rotating twin shafts: if tines are installed on the twin shafts, soil tilling, weeding can be done; if auger blades with or without digging bits are in place instead, the machine can simultaneously till and remove soil or can remove ice/snow, or rack and shred leaves; if the front shaft is installed with a spiked roller and the rear shaft, a shearing reel, then the machine can power de-thatch and mow grass at the same time, and, additional grass clipping mulching ability can be performed if a fan blower equipped with a mulching fan blade and a retractable bedknife is in place.

20 Claims, 14 Drawing Sheets

COUNTER-ROTATING TWIN SHAFT SYSTEM FOR GARDENING MACHINES

CROSS-REFERENCE TO RELATED U.S. PATENT APPLICATIONS

This application is a continuation-in-part of U.S. Ser. No. 07/672,380 filed Mar. 20, 1991, now U.S. Pat. No. 5,101,911.

BACKGROUND OF THE INVENTION

The subject invention introduces two new improvements of the "rotor tiller having counter-rotating twin shafts" invention for additional utilities.

One improvement is to remove the housing, the engine, and to bring the transmission to the mid-section of the twin shafts. This improved variation can be coupled to a conventional lawn tractor, and a large version of it having extended shafts with multiple tines can be driven by a large tractor for large scale tilling of soils in gardening and agricultural works. Conversely, a small version of the same variation can be coupled to a hand held power tool such as a conventional power string trimmer for tilling and power weeding of small plots and flower beds.

Another variation is to replace the tines, auger blades on the twin shafts with a spiked roller on one shaft and a shearing reel having a bedknife on the other shaft. In addition, a blower having a specially designed shearing-/mulching fan blade and bedknife for creating air suction and for mulching of grass clippings is provided. This variation has several advantages over conventional rotor blade or shearing reel mower. The combined action of spiked roller, shearing reel and the blower allows four functions to be performed simultaneously by a single machine: power de-thatching/racking, mowing, vacuum and mulching of lawn grass. Moreover, this version of the machine is much safer than either the conventional rotor blade or reel type mower as the spiked roller, while de-thatching, rotates forward, away from the rearwardly positioned shearing reel, thus preventing debris, rock, and human appendages from entering the shearing reel.

SUMMARY OF THE INVENTION

Variation One

This variation comprises two counter rotating shafts. The shafts are rotatably mounted on the side walls of a centrally located transmission box, transversely thereof relative to the direction of machine travel. One member of the shaft is forwardly mounted and the other, being parallel in position on the same horizontal plane, is rearwardly mounted. Affixed to each shaft are "digging and/or transporting means" which can be tines, blades, paddles or other digging apparatus of appropriate shapes and sizes. In another embodiment, in place of the tines, helical auger blades can be affixed on one or both of the shafts, and a plurality of digging bits can be attached to the auger blade for simultaneous digging and transporting of material being operated on such as soil, gravel or ice/snow. The number of "digging and/or transporting means" such as tines and the lateral length of each helical auger blade can vary.

The transmission box is located centrally, at the mid-section of the shafts. Each shaft extends through an aperture at the base of the box into the central opening of a sprocket of identical size inside the box. Also extending into the top of the box through another aperture, and generally in parallel to the shafts below, is an engine drive shaft which terminates in a sprocket of smaller diameter. The three sprockets in the transmission box are linked together by a drive chain. To creat counter rotation of the two shaft members, the drive chain winds circumferentially around the opposite sides of their respective sprockets. Therefore, viewing from the left side into the box from behind the machine, the chain winds on the teeth around the right, bottom and lower left circumference of the rearwardly mounted shaft sprocket; then, the chain reverses direction by winding around the teeth at the top, left and lower left circumference of the forwardly mounted shaft sprocket; here, a pulley idler is required to hold the chain in place against the left and lower left side of the forwardly mounted shaft sprocket so that a firm engagement of the chain with the teeth thereof can be maintained at all times. After the chain leaves the pulley idler, it is engaged with the engine drive shaft sprocket to complete the drive cycle. This way, a clockwise rotation of the engine shaft will drive the rearwardly mounted shaft and its two tines to rotate also clockwise, but the forwardly mounted shaft member and its two tines will rotate in the exact opposite direction, counter-clockwise, to create the counter rotating shafts and tines configuration.

In another embodiment, the engine drive shaft directly drives one of the twin shafts via a worm and wormgears mechanism or a bevel gears coupling.

Normally, the counter-rotating twin shaft members and their respective tines are held together in close apposition by extension springs without actually touching. Their close proximity would have the advantage of breaking up soil into fine consistency. However, the close proximity can also trap rock/hard matter in between the rotating mechanism as the counter rotating tine blades on their respective shafts move towards each other at the ground level. This problem can be resolved by permitting the rearwardly mounted shaft and tine member to slide parallel and rearward relative to the fix positioned forwardly mounted shaft and tines. The rearward sliding movement is made possible by rotatably resting the rearwardly mounted shaft on a sliding track in the side wall of the transmission box. The track allows only horizontal, with no vertical nor lateral movements for the rearwardly mounted shaft and its tines at anytime. If a rock is caught in between the counter rotating tines, the rearwardly mounted shaft will respond by sliding rearward, thus creating space between the two sets of counter rotating tines and to allow the tines to continue to rotate until the rock/hard matter is ejected from between the counter rotating tines. After rocks/hard matter is ejected, the extension springs on either side walls of the transmission box pulls the rearwardly mounted shaft and its tines forward along the path defined by the sliding tracks; thus the original close proximity configuration of the counter rotating shaft and tine members is restored.

If the counter rotating tines are of exact size and shape and have a similar degree of rotation, they will dig/till the ground/soil with equal but opposing force; and the forward digging force generated by the tines of the forwardly mounted shaft will be canceled by an equal, rearwardly directed digging force generated by the tines of the rearwardly mounted shaft. The balanced but opposed digging force generated by the counter rotating tines allows the machine to stay stationary while the ground/soil is being dug/tilled continuously beneath the machine. On the other hand, if the machine is tilted forward, the weight of the machine will be shifted forward allowing the tines of the forwardly mounted shaft to dig deeper into the soil; the excess traction developed by these tines will overcome that of the rearwardly mounted tines, and the machine will move forward instantly. Likewise, if the machine is tilted rearward, the rearward traction will increase and the machine will move backward instantly. The depth of ground digging and the speed of forward or backward movement can be readily controlled by the amount of forward and rearward tilt of the machine.

Variation Two

This variation while similar to the original version described in the "rotor tiller having counter-rotating twin shaft" invention, is an improved version where the shafts have, instead of tines or helical auger blades, a spiked roller affixed to the shaft at the front end of the machine. Vertical, spring loaded movement for this shaft is allowed so that the height of the spiked roller relative to the ground will be kept constant automatically, this will allow the spiked roller to ride on the contour of the ground on which the machine travels. A conventional grass shearing reel is affixed to the shaft at the rear end of the machine. Further, a stationary bedknife for the shearing reel is mounted on the side walls of the machine housing. A gear driven mechanism allows directional reversion in counter-rotation. In this case, the twin shafts rotate away from each other at ground level; in response, the spiked roller in front will de-thatch and push debris away from the machine while the shearing reel at rear will shear grass that is already been de-thatched and cleaned of debris. The relative positions of both the spiked roller and shearing reel with each other and with the ground or bedknife can be adjusted.

A blower can be located either on the side or at the top of the machine which creates a strong suction for pulling the grass leaves upward for shearing purposes. The sheared off grass is then sucked into the blower for mulching by the action of the shearing fan blade and stationary bedknife before discharging outside or back into the machine housing for further mulching. The fan blade of the blower is made of a piece of thick metal whose side along its long axis is sharpened. A bedknife is in light contact with the entire length of one side of the fan blade. As the fan blade rotates, the side facing the bedknife rubs gently against the shearing edge of the bedknife which together, mulches the grass clippings. The blower therefore provides three functions: 1. creates a vacuum inside the machine housing to pull the grass upwards; 2. shearing or mulching of grass clippings; 3. discharge of mulched clippings outside of or back into the machine. The blower is driven to rotate by one of the counter-rotating shaft through a belt-pulley system.

Finally, a set of wheels, driven by one of the shafts is provided for self propelled motion.

DETAILED DESCRIPTION OF THE INVENTION

Figure 1:
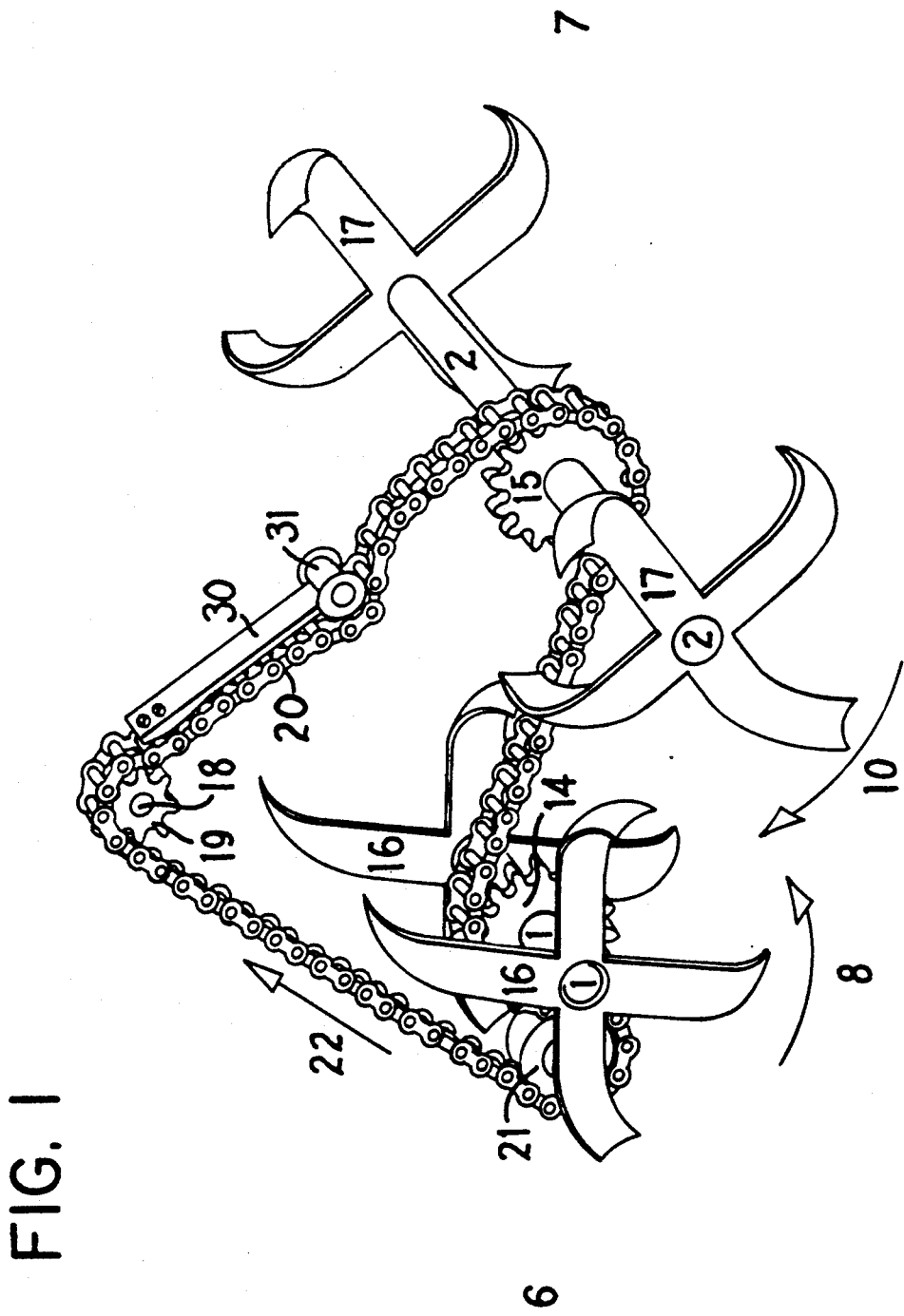
FIG. 1 is a 60 degree angle view of the tines and twin shafts connected by the sprockets and the drive chain.

I. Counter-rotating twin shafts having tines and auger blade attachments

FIGS. 1 through 6 show the twin shafts 1, 2, being mounted transversely thereof on the walls 3,4 of a transmission box 5. Shaft 1 is mounted forwardly 6 and shaft 2, positioned parallel lengthwise, is mounted rearwardly 7.

Shaft 1 rotates in a first direction 8 freely on a ball bearing 9, one in each side wall 3 or 4 and shaft 2 rotates in a second direction 10 freely on a similar ball bearing 11, one at each side wall 3 or 4. At left, viewed from the rearward direction 7, the shafts 1, 2 extend through an aperture 12,13 respectively in the side walls 3 and 4 into the bottom portion of the transmission box 5 having a triangular shape; aperture 13 is elongated horizontally. Inside the transmission box 5, shaft 1 and 2 respectively fit through the center opening of sprockets 14 and 15, both having a similar diameter; rotation of sprocket 14,15 causes an exact rotation of their respective shaft 1 and 2 and the tines 16,17 affixed thereupon. At the top of said transmission box 5 and generally in parallel to shafts 1, 2 below is a drive shaft 18 that can be readily coupled to an engine. The drive shaft 18 terminates in a smaller chain sprocket 19. All the sprockets 14,15,19 are linked together by a drive chain 20. To create counter rotational movement between sprockets 14 and 15, the drive chain 20 winds circumferentially around the opposite sides of sprocket members 14,15. Therefore, viewing the left side of the machine from behind 7, the drive chain 20 winds around the teeth of sprocket 15 at the top, right, bottom and lower left circumference; then, it reverses its direction by winding around the teeth on the opposite side of sprocket 14 at its top, left and lower left circumference; here, in order to keep the chain 20 firmly engaged with sprocket 14 at all times, a pulley idler 21 is used to hold the chain 20 in place against the left and lower left circumference of sprocket 14; the pulley idler 21 is rotatably mounted on the side walls 3,4 of transmission box 5. After chain 20 leaves the pulley idler 21, it is engaged with sprocket 19 of the engine drive shaft 18 for completion of a drive cycle 22. This way, a clockwise rotation of the engine drive shaft 18 will drive the rearwardly mounted shaft 2 and its two tines 17 to rotate clockwise 10, but the forwardly mounted shaft 1 and its two tines 16 to rotate in the exact opposite direction, counter-clockwise 8, thus causing the tine 16 to move towards tine 17 at the ground level, and vice versa; likewise, if the engine drive shaft 18 rotates in a counter-clockwise direction, the tines 16 and 17 will move away from each other at the ground level; and this is the basis for the instant invention. Obviously, there are other ways to create counter rotation such as by a direct engagement of the gear teeth of a gear wheel with that of a neighboring gear wheel. However, the chain and sprocket arrangement described here represents one of the simplest, flexible and reliable means for creating counter rotation of two opposing shaft members.

Figure 2:
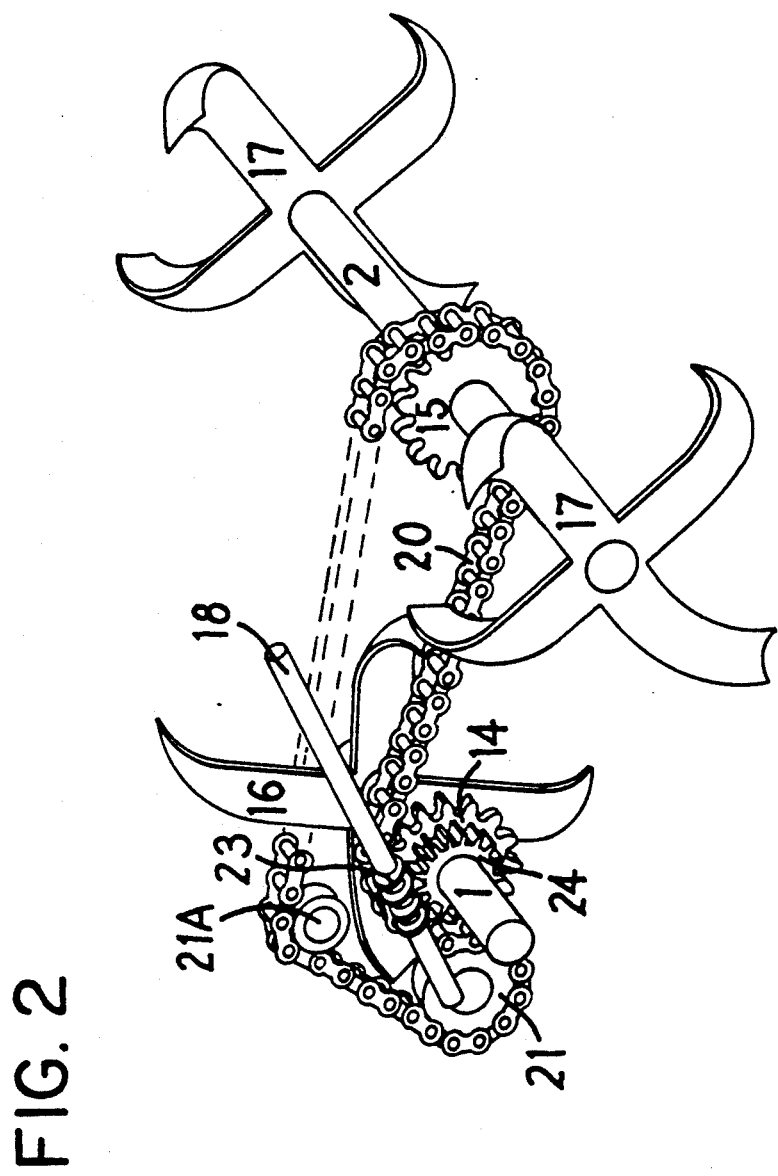
FIG. 2 shows the engine drive shaft that drives the front shaft directly through a worn and wormgears coupling.
Figure 3:
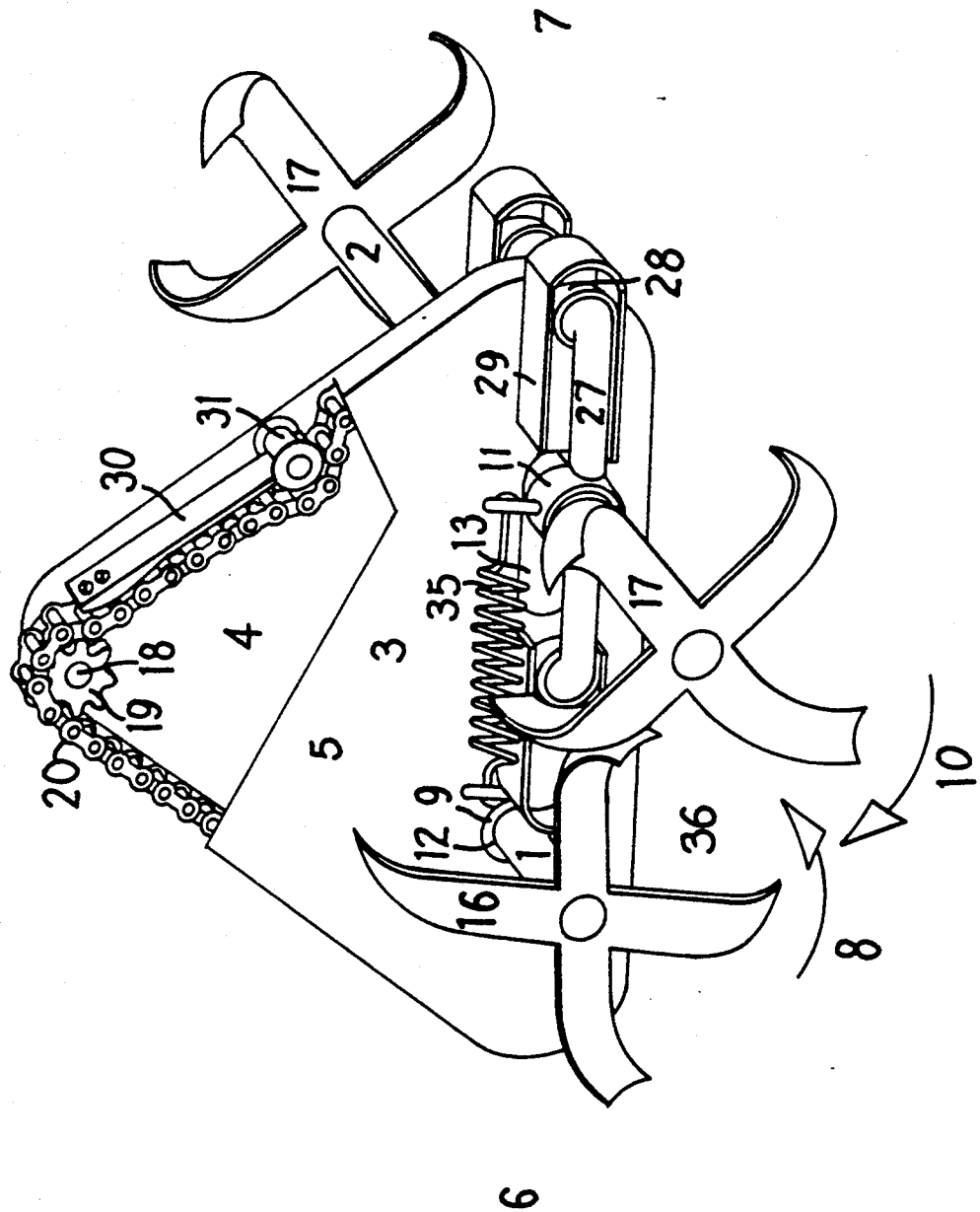
FIG. 3 is a view of the sprockets and drive chain housed inside the transmission box with cut-outs. Also shown on the transmission box are the sliding tracks.

In another embodiment, the engine drive shaft 18 can directly drive either shaft 1 or shaft 2. This can be done, for example, by installing on the engine drive shaft 18, a worm 23 that is engaged with wormgears 24 on shaft 1 (FIG. 2). This would transmit power directly to one of the twin shafts and would eliminate sprocket 19, but may require an additional pulley idler 21A.

Figure 4:
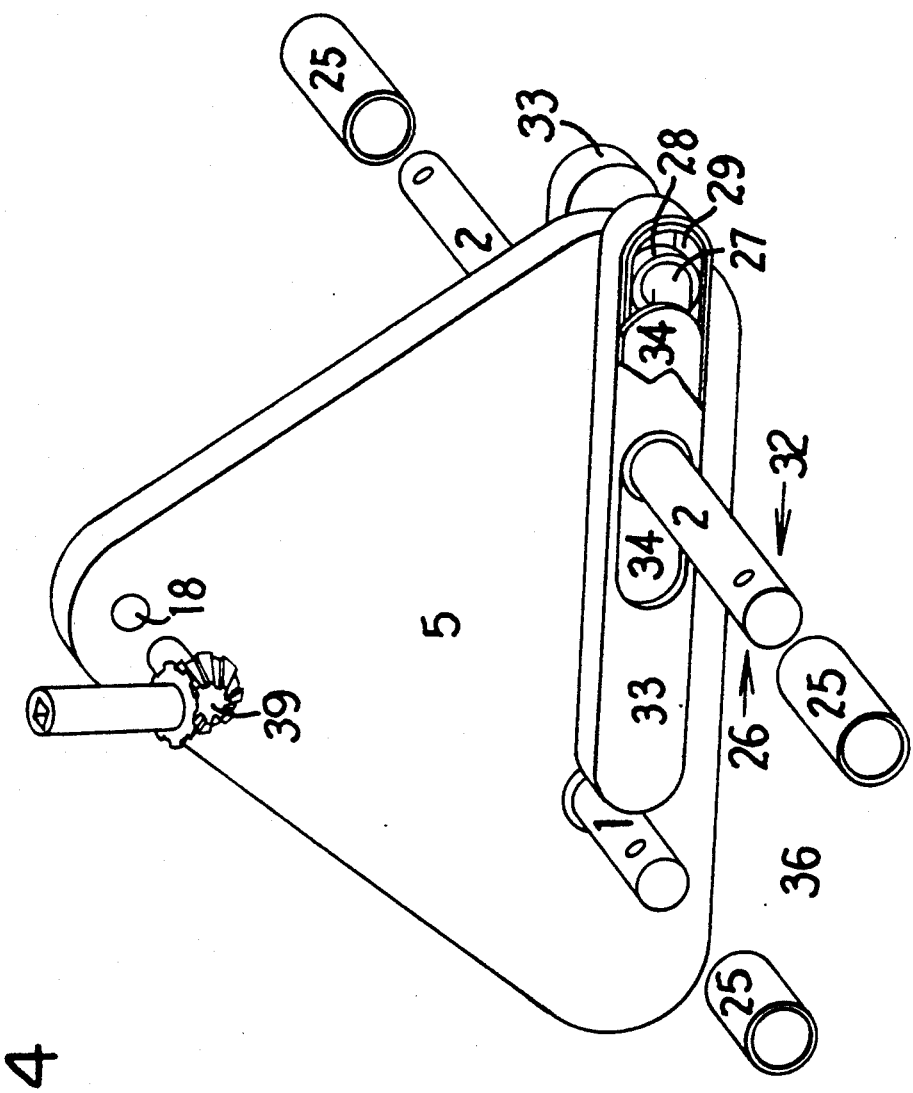
FIG. 4 shows the sliding track housed in a dust cover with a sliding cover diaphragm. Also shown are the shaft sleeves and a bevel-gear coupling.
Figure 5:
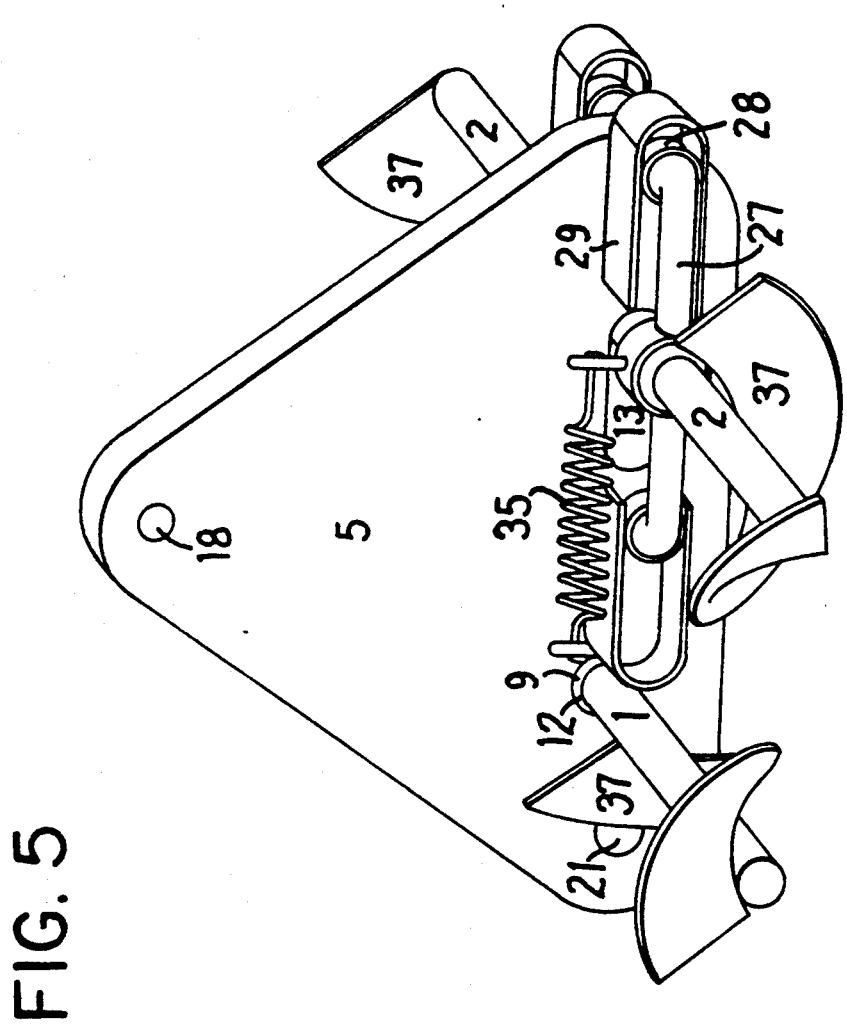
FIGS. 5 and 6 show on the shafts, helical auger blades with and without digging bits.
Figure 6:
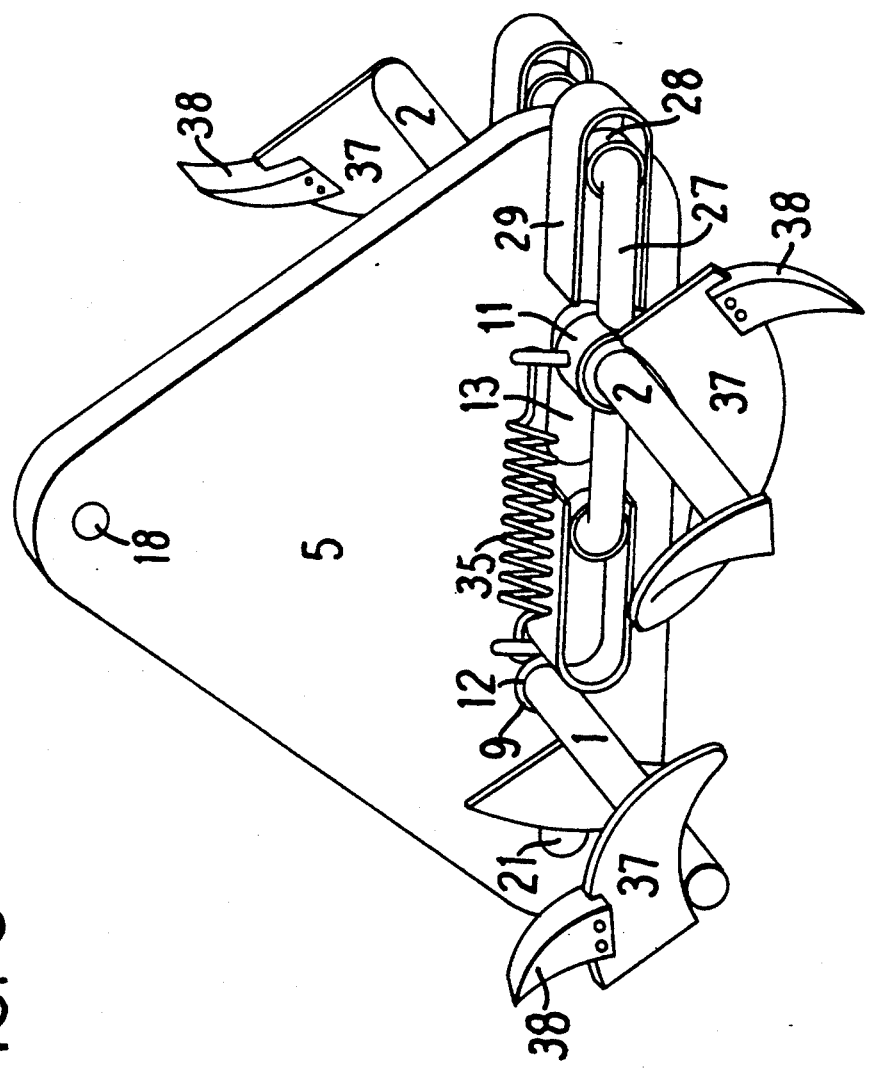

The tines 16,17 are removably fixed on their respective shaft 1,2 using nuts and bolts and their positions and the length of the shafts 1, 2 can vary as to provide the maximal ground coverage; for example, the two rear tines 17 can be placed wide apart, one near each end of shaft 2. The forward tines 16 can be positioned closer together, near the mid-section of shaft 1, or vice versa. Further, equal and adequate lateral spacing are provided for all tines so that they would not touch each other or any parts of the machine except the ground at all times. The shafts 1,2 and their bearings 9,11 are removably mounted on the side walls 3,4 and the shafts 1,2 can also be removed separately from their bearing 9,11 by removing a washer and lock-pin for servicing or replacement of the tines with helical auger blades or other attachments. To reduce the tendency for the rotating shafts 1,2, to pick up fibrous debris, stationary shaft sleeves are 25 are provided to cover exposed shaft areas (FIG. 4).

The circumferential positions occupied by the tines 16 on shaft 1 can alternate with that of the opposing tines 17 on shaft 2. In this way, the outer edge of tines 16 can reach close to the center of rotational circle of the opposing tine 17, and vice versa. As the opposing tines 16,17 rotate away from each, they will clean each other of tangling weeds, debris etc. that are picked up from the soil while tilling the ground.

Normally, the twin counter rotating shaft members 1,2 and their respective tines 16,17 are held in close juxtaposition facing each other without touching while rotating. This close configuration has the advantage of breaking up the dug up soil into fine consistency, but the chance of trapping rock/hard matter in between the counter rotating tines 16,17 also increases. This problem can be resolved by permitting the rearwardly mounted shaft 2, its tines 17 and its sprocket member 15 to slide rearward 26 relative to the fix positioned counterparts 1,16 and 14. The rearward sliding movement 26 can be achieved by mounting the ball bearing 11 on a sliding mechanism. For example, each ball bearing 11 can rest on the mid section of a supporting arm 27 positioned horizontally and perpendicularly to the long axis of shaft 2; either end of arm 27 terminates in a ball bearing roller 28 which slides horizontally inside a sliding track 29 located on the side walls 3,4. Since roller 28, arm 27, ball bearing 11 and shaft 2 are tightly interconnected forming one slidable unit, they are collectively referred to hereafter as the slidable unit. The sliding track 29 is constructed to allow only horizontal and a juxtaposition sliding of shaft 2 relative to the position of shaft 1; no lateral nor vertical movements of either shafts 1 or 2 are allowed at any time. Inside the transmission box 5, excess length of the chain 20 is provided to allow sprocket 15 to slide along aperture 13 freely with the slidable unit. To properly tension the chain 20 of excess length so that a firm engagement of chain 20 with all sprockets 14,15,19 can be maintained at all times, a tensioner 30,31 can be used; the tensioner can be of any type such as in the form of a flat spring 30 whose one end is affixed to the wall of transmission box 5 facing the lower right side of sprockets 19 while its other end terminates in a roller 31. The tensioner 30,31 exerts a constant force on chain 20 to keep it fully stretched and firmly engaged with the teeth of chain sprockets 14,15,19 at all times.

Therefore, with this or similar arrangements, shaft 2, while rotating, can also slide either forwardly 32 or rearwardly 26 for a distance as defined by sliding track 29. The components of the slidable unit can be comprised of any suitable parts and means as to provide maximal ease for shaft 2 to rotate and slide simultaneously in a manner just described. For example, each bearing 11 carrying the rearwardly mounted shaft 2 can be placed directly in the sliding track 29 without use of the arms 27 and roller 28. To prevent dust and debris from entering the sliding track 29 and the rollers 28, a dust cover 33 having a sliding cover diaphragm 34 or other appropriate sealing means can be used to cover these components. Other mechanisms allowing shaft 2 to slide rearward can be envisioned. For example, each end of shaft 2 can rest on a carrier hinged upon the side walls 3,4 and will swing backwards and/or upwards if a rearward directed force is acted on shaft 2.

Normally, the slidable unit is held closest to shaft 1 by an extension spring 35 with adjustable force; one end of spring 35 is anchored on the side walls 3,4 or the sliding track 29 and the other end is anchored on the supporting arm 27 or a stationary spot on ball bearing 11. If tines 17 dig into a hard ground or rock that generate a resistance force greater than the pull of springs 35, the spring will extend, allowing the slidable unit to slide rearwardly 26 along track 29; as new space 36 is created in between the juxtapositioned shafts 1 and 2, the tines 16,17 can continue to rotate to eventually loosen the hard soil or eject the rock from between the counter rotating tines 16,17. Upon loosening of the hard ground or ejection of rocks caught between tines 16,17, the slidable unit will automatically slide forward 32 along track 29 under the pull of the extension springs 35 to resume its original close juxtaposition with shaft 1. During transitional back 26 and forth 32 sliding movements, free rotation of shaft 1 and 2 and their respective tines 16,17 or attachments will be maintained.

To increase flexibility, each of the shaft 1 or 2 can be fitted by a different set of attachment. For example, shaft 1 can be fitted with tines 16 whereas shaft 2, can be fitted with auger blades 37 with or without digging bits 38, and vice versa.

To work, the machine can be coupled to an engine or power source. For example, a large version of this machine can be driven by the engine of a lawn/garden tractor. Still larger version with extended shafts 1,2 and multiple number of tines 16,17 and/or auger blades 37,38 can be driven by a farm tractor.

Figure 7A:
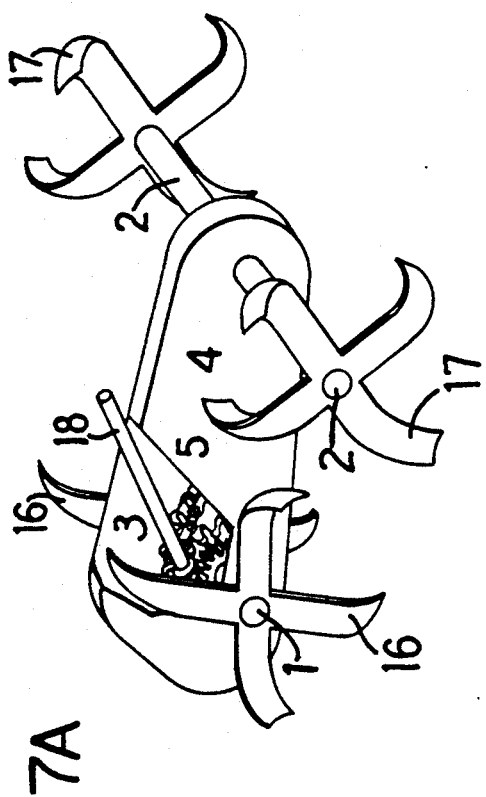
FIGS. 7A and 7B show small versions with an engine drive shaft either directly (top) or indirectly (bottom) driving the counter-rotating twin shafts.
Figure 7B:
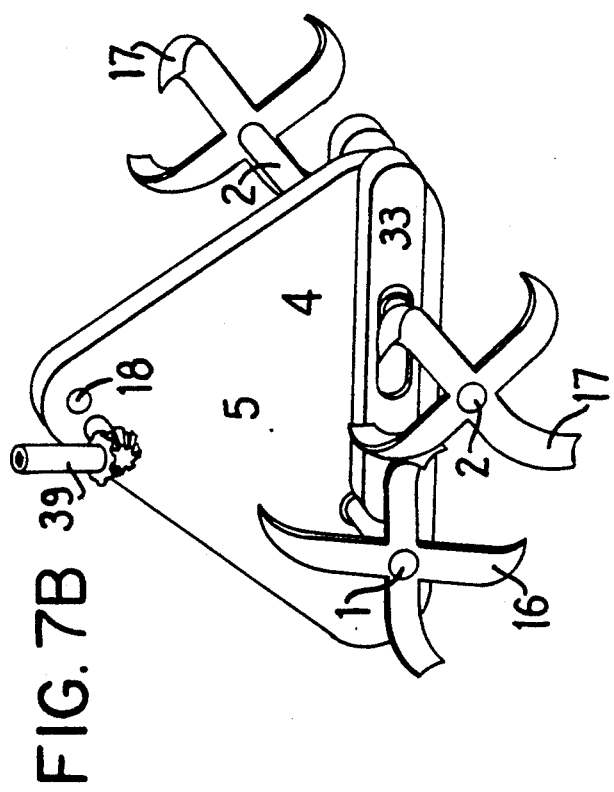

Conversely, a small version of the machine can be driven by a small hand-held engine or power source. For example, as illustrated in FIGS. 7A and 7B, a small machine of this type, one of its shafts, 1 or 2, can be driven directly via a worm 23 and wormgears 24 coupling (FIG. 7B), or indirectly, via sprocket 19 (FIG. 7A), with or without bevel gears 39 by a conventional hand-held power line trimmer, or the like.

II. Counter-Rotating Twin Shafts having a spiked roller and a shearing reel attachments.

In another embodiment, the tines 16 of shaft 1 and that 17 of shaft 2 can be replaced respectively by a spiked roller 40 and a shearing reel 41 for simultaneous de-thatching and mowing of lawn grass.

Figure 8:
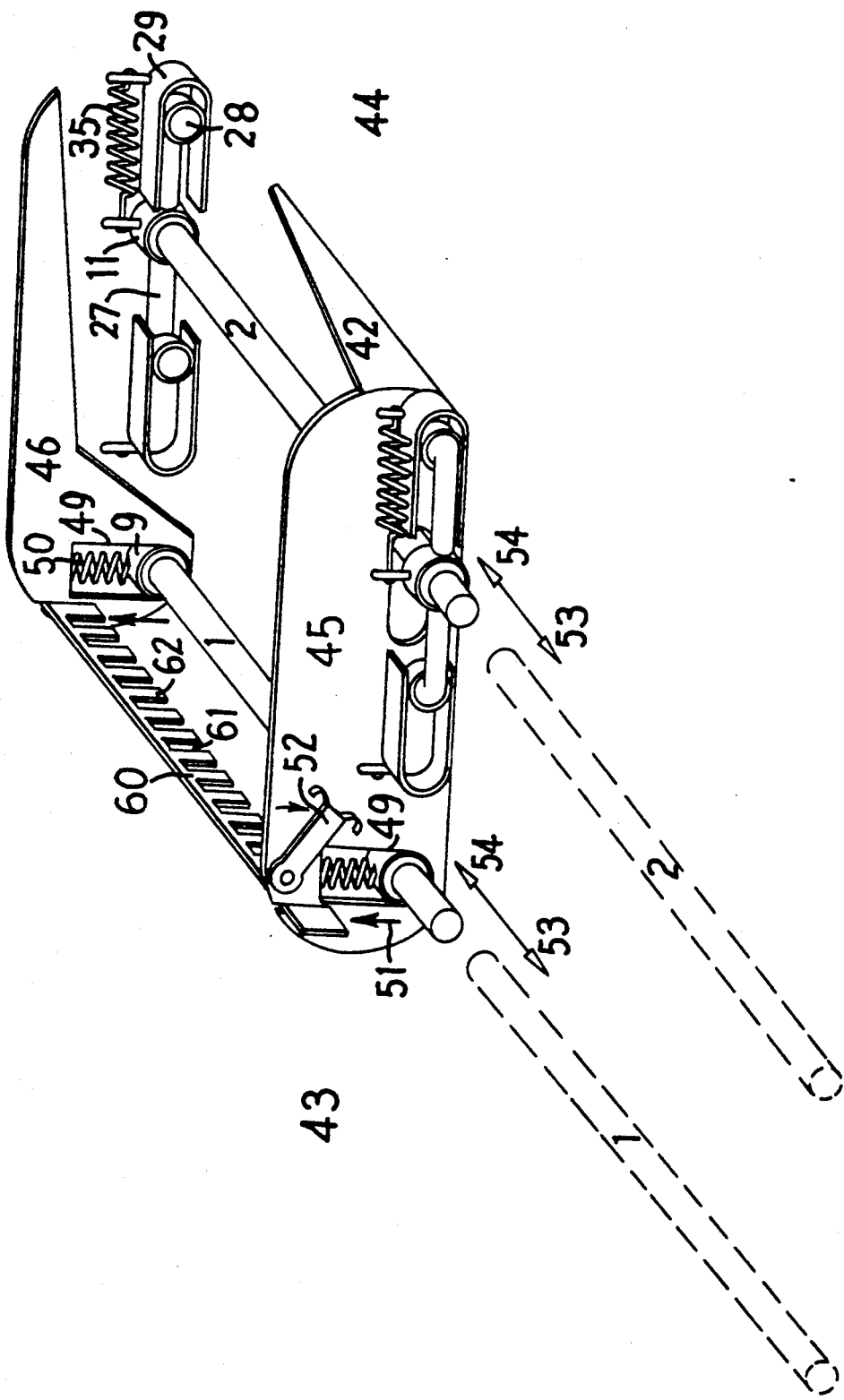
FIG. 8 shows the twin shafts mounted on the side walls in a housing where vertical motion is allowed for the front shaft and a comb-like bar structure for cleaning of thatch/debris from the spiked roller is in place. Also shown in the rear shaft rests on sliding tracks having a spring mechanism for pulling the rear shaft towards the rear. Further shown are the twin shafts removed from the housing.
Figure 9:
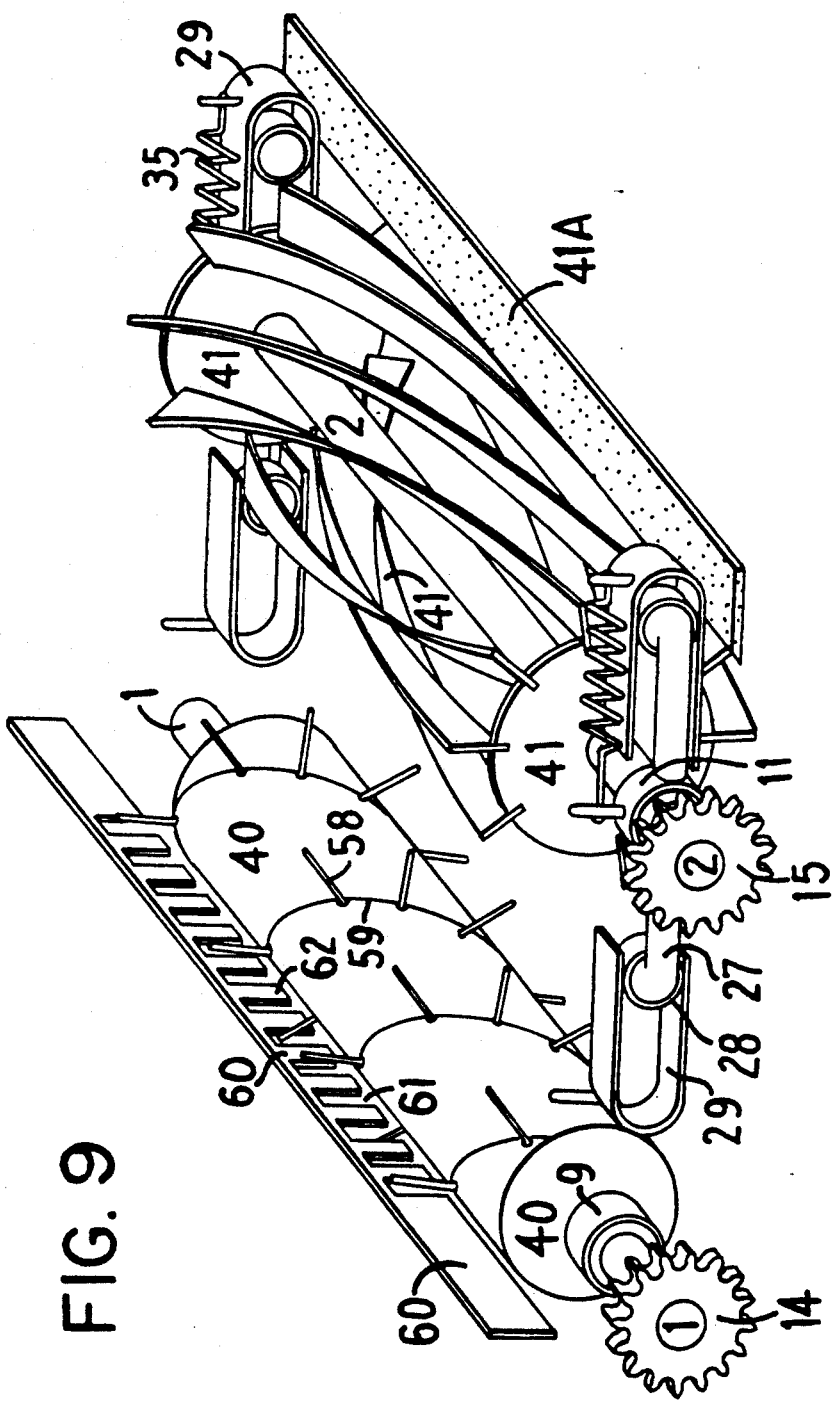
FIGS. 9 and 10 show a spiked roller at front and a shearing reel with bedknife at rear, all properly installed on the shafts relative to the positions of other components.
Figure 10:
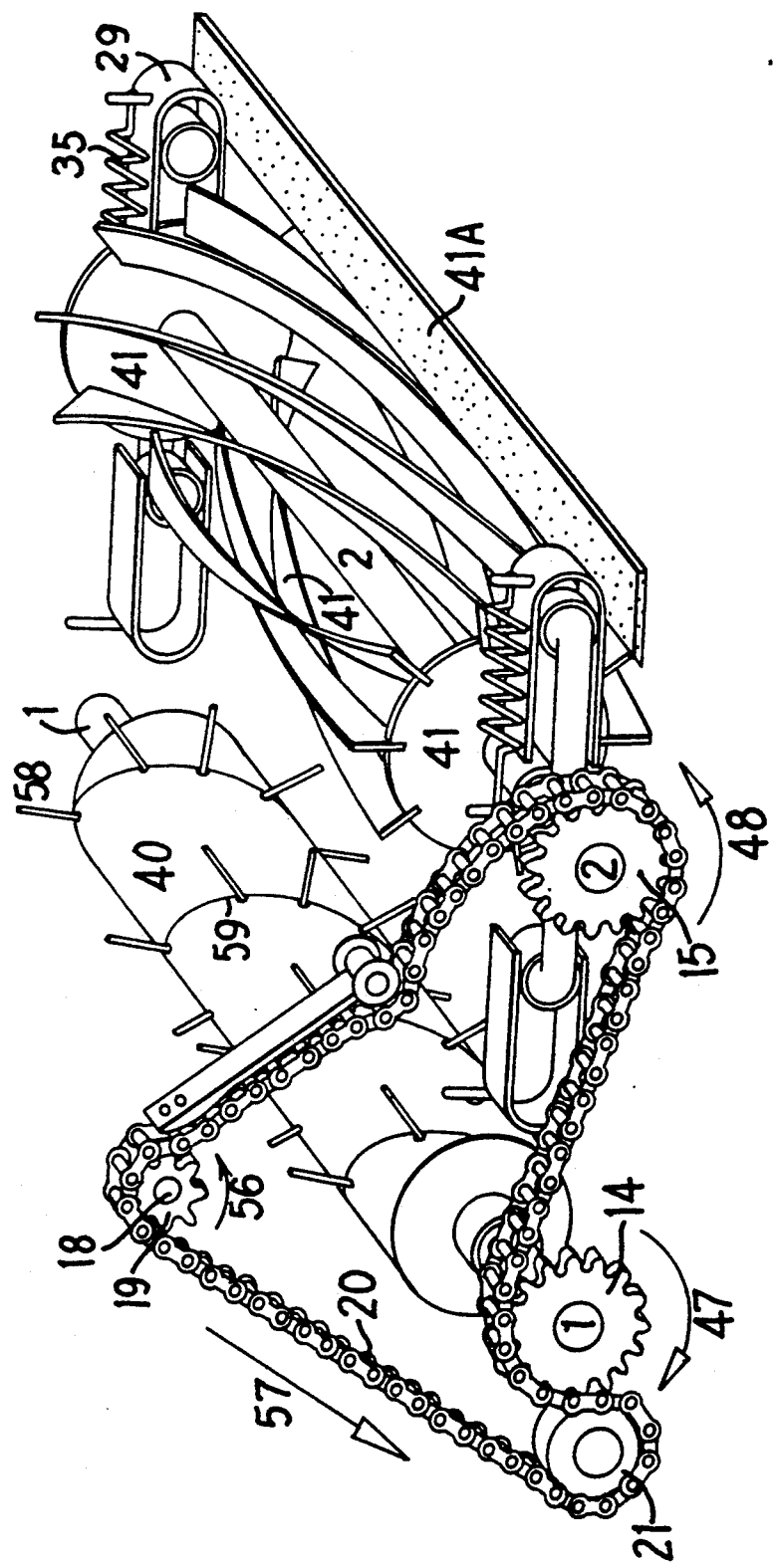

FIGS. 8 through 13 show the twin shafts 1, 2, being mounted transversely thereof inside the housing 42 relative to the forward 43 and rearward 44 direction of machine travel; shaft 1 is mounted forwardly and shaft 2, positioned parallel lengthwise, is mounted rearwardly on the walls 45,46 on opposite sides of the housing 42. Shaft 1 rotates 47 freely on a ball bearing 9 one in each side wall 45 or 46 and shaft 2 rotates 48 freely on a similar ball bearing 11 in the side walls 45,46. Preferably, shaft 1 can have some vertical movement. This can be done by allowing shaft 1 to slide upwards 51 in a sliding slot 49, one in each housing wall 45,46 against the force of a compression spring 50 (FIG. 8). This will allow the spiked roller 40 to ride on the contour of the ground as it travels. If vertical motion of shaft 1 is not desired, a slap-on lock 52 will prevent shaft 1 from having the vertical motion. Further, shaft 1 and 2 can be withdrawn from 53 or inserted into 54 the bearings 9,11 in the side walls 45,46 (FIG. 8).

As viewed from the rearward direction 44, shafts 1, 2 extend through an aperture 12.13 respectively in the side wall 45 into the bottom portion of a transmission box 5 having a triangular shape; aperture 13 is elongated horizontally. Inside the transmission box 5, shaft 1 and 2 terminate respectively in sprockets 14 and 15, both having a similar or different diameter; rotation of sprocket 14,15 causes rotation of shaft 1 and 2 their respective spiked roller 40 and shearing reel 41 affixed thereupon. At the top of said transmission box 5 and generally in parallel to shafts 1, 2 below is the drive shaft 18 connected to an engine 55. The drive shaft 18 terminates in a smaller sprocket 19. All sprockets 14,15,19 are linked in the box 5 by a drive chain 20. To create counter rotational movement between sprockets 14 and 15, drive chain 20 winds circumferentially around the opposite sides of sprocket members 14,15. Therefore, from the side wall 45 on the left looking into the transmission box 5, the drive chain 20 winds around the teeth of sprocket 15 at the top, right, bottom and lower left circumference; then, it reverses its direction by winding around the teeth on the opposite side of sprocket 14 at its top, left and lower left circumference; here, in order to keep the chain 20 firmly engaged with sprocket 14 at all times, a pulley idler 21 is used to hold the chain 20 in place against the left and lower left circumference of sprocket 14; the pulley idler 21 is rotatably mounted on the side wall 4 of transmission box 5. After chain 20 leaves the pulley idler 21, it is engaged with the sprocket 19 on the engine drive shaft 18 for completion of a drive cycle 22. This way, anticlockwise rotation 57 of the engine drive shaft 18 will drive the rearwardly mounted shaft 2 and its shearing reel 41 to rotate anti-clockwise 48, but the forwardly mounted shaft 1 and its spiked roller 40 to rotate in the exact opposite, clockwise direction 47 as defined by the direction of drive chain 20 movement 57; in this way, the spiked roller 40 and the shearing reel 41 move away from each other at the ground level.

The spiked roller 40 can be hollow. The spikes 58 can be made of flexible steel and can be arranged on the roller 40 outer surface in spiraling fashion 59. The spiral arrangement 59 of spikes 58 will facilitate debris to be moved to one side of the machine. To remove thatch that got stuck on the spikes 58, a stationary comb-like bar 60 is placed lengthwise above the spiked roller 40 such that as the roller 40 rotates, its spikes 58 passes through the openings 61 between the teeth 62 of the comb-like bar 60 which traps the thatch/debris, preventing the latter from entering into the machine housing 42.

The shearing reel 41 and bedknife 41A are of conventional type except that the bedknife can be impregnated with abrasive material such as silicon carbide for self sharpening of the blades on the shearing reel 41 as it rotates.

Figure 11:
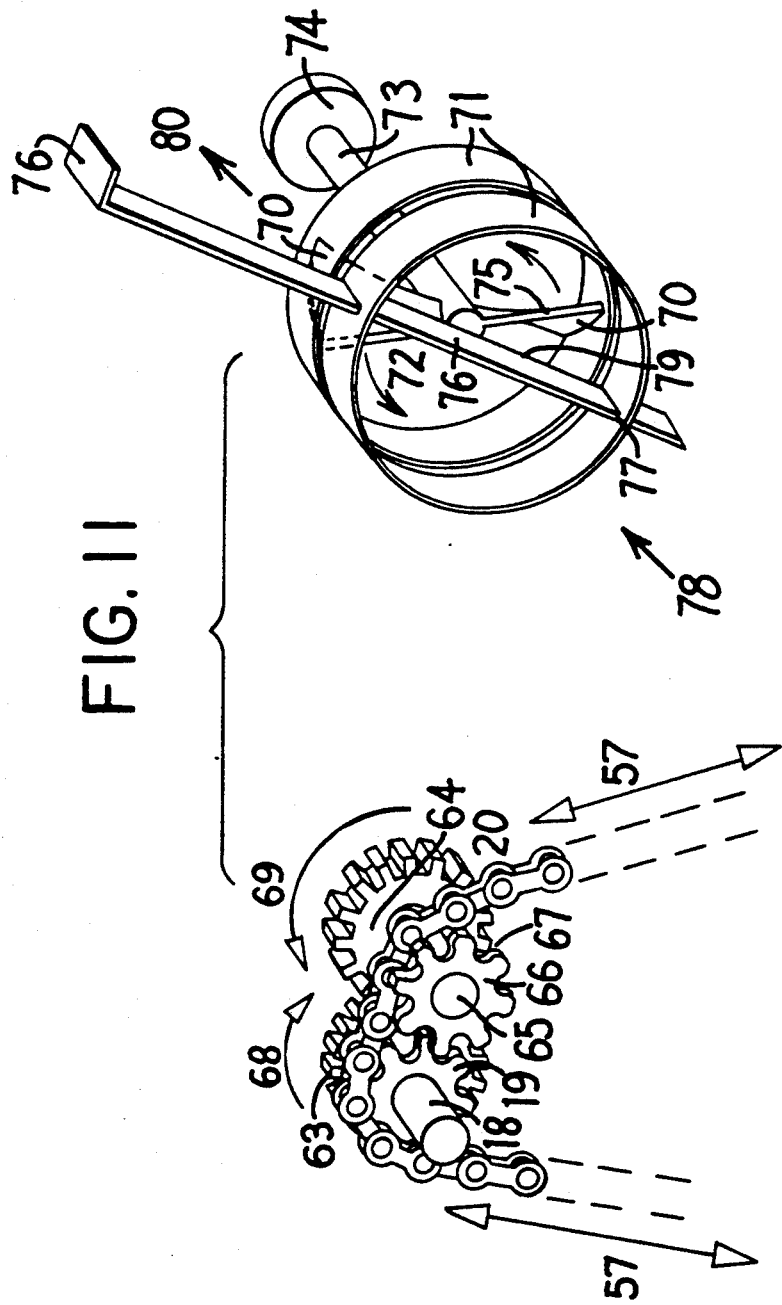
FIG. 11 shows a gear mechanism for reversing the direction of counter-rotation (left) and a fan blower with a shearing fan blade and bedknife for suction and for grass mulching (right).
Figure 12:
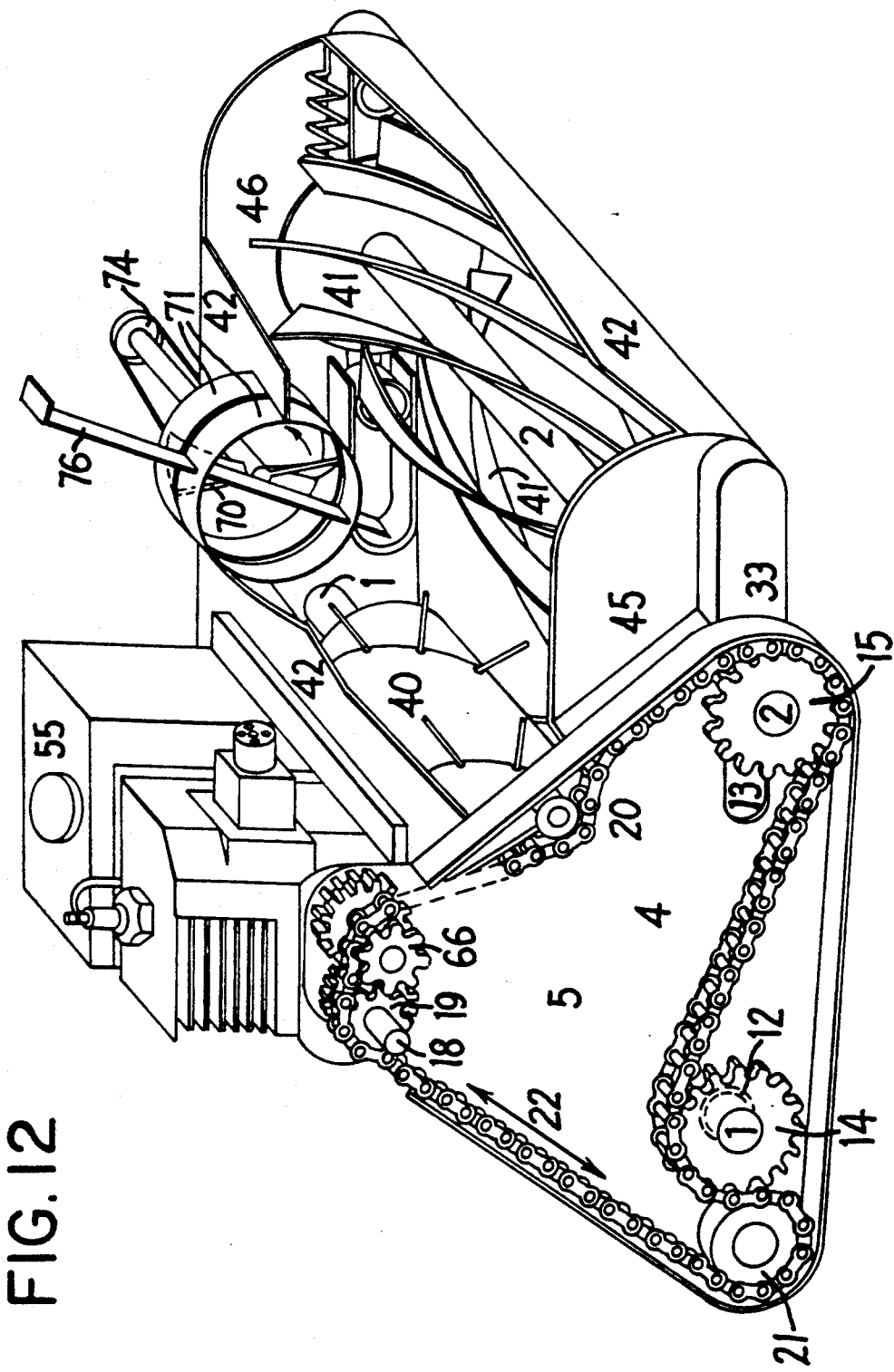
FIGS. 12 and 13 show the complete machine with cut-outs, revealing all components properly installed with or without wheels and guide handles.
Figure 13:
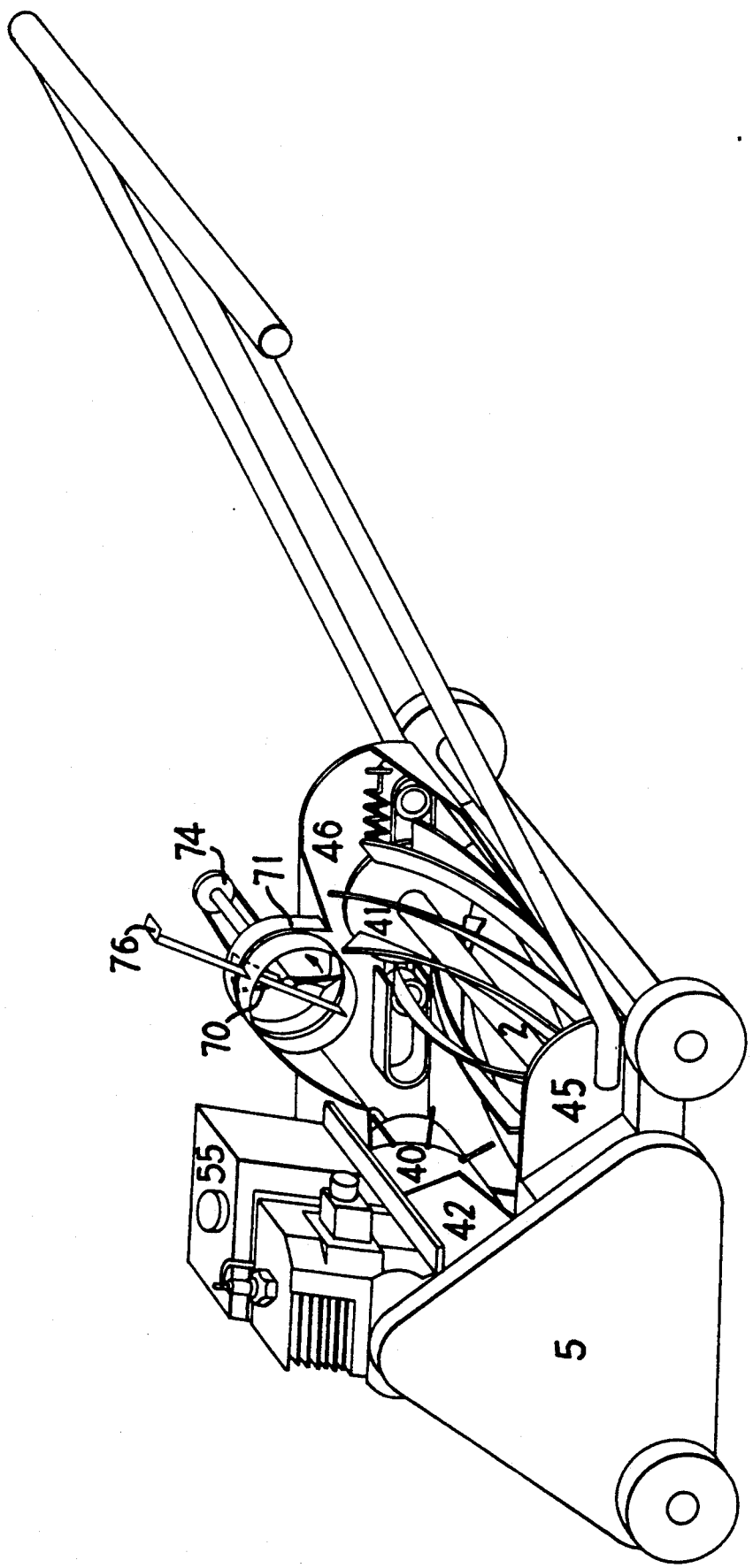
Figure 14:
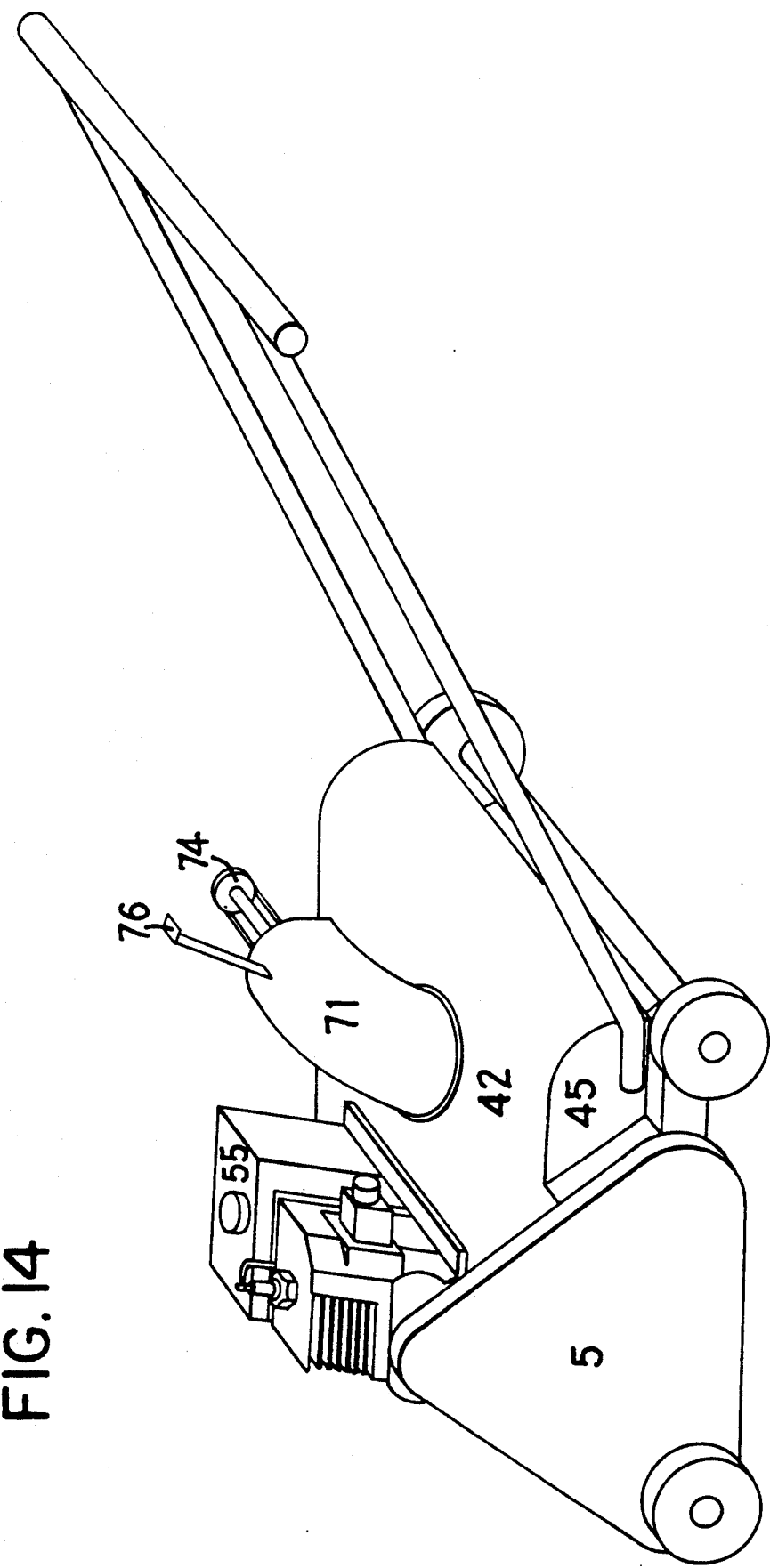
FIG. 14 is an outside view of the machine.

If reversal of direction in counter-rotation is desired, as in the case where the spiked roller 40 and shearing reel 41 on shafts 1,2 are replaced for de-thatching and grass shearing purposes, a gear mechanism for direction reversion can be used (FIG. 11, left). This can be accomplished by engaging the teeth of two gear wheels 63,64 whose shaft 18 or 65 also carries sprocket 19 or 66. A space 67 equal to the thickness of the drive chain 20 is provided between sprocket 66 and its gear wheel 64. In this way, as gear wheel 63 is driven to rotate clockwise 68, gear wheel 64 will rotate counter-clockwise 69, and depending on which sprocket, 19 or 66 that the drive chain 20 is engaged with, the direction of chain travel 57 can be reversed. To select sprockets 19,66 for chain 20 engagement, the chain 20 can be lifted above the sprockets 19,66 and moved to above the desired sprocket before lowering it for engagement.

To facilitate grass mowing and mulching, a blower fan with mulching capability is installed (FIG. 11, right). This blower and mulching fan blade 70 is enclosed in a short metal tube 71 of suitable dimension to be mounted on the side wall 45 or 46 or at the top of the machine housing 42. The fan blade 70, preferably made of thick metal, is driven to rotate 72 centripetally inside the tube 71 by drive shaft 73 that is coupled to one of the twin shafts, 1 or 2 through a belt-pulley system 74. One side 75 of the fan blade 70 running along its long axis is sharpened, serving as a shearing edge 75. Parallel lengthwise to the shearing edge 75 of the fan blade 70 is a bedknife 76 positioned through rectangular holes 77 in the tube 71 immediately in front of the fan blade 70. The position of the bedknife 76 in front of the fan blade 70 can be adjusted as to provide maximal efficiency for grass shearing and mulching. As the fan blade 70 is driven to rotate 72, suction 78 is created and grass clippings are sucked into the tube 71 where it is sheared/mulched by the shearing edge 75 of the rotating fan blade 70 against the shearing edge 79 of the stationary bedknife 76. The sheared off grass clippings are carried by air current 80 to outside of housing 42, or, back into housing 42 for further shearing/mulching. To clear away debris (e.g. rocks, tree branches etc.) caught between the rotating fan blade 70 and bedknife 76, or to eliminate shearing/mulching action, the bedknife 76 can be pulled out or retracted from its holes/tracks 77 in the tube 71. To facilitate smooth grass shearing action, the fan blade 70 can be "S" shaped. Either or both of the fan blade 70 and/or bedknife 76 can be made of materials (e.g. steel) impregnated with abrasive materials such as silicon carbide for automatic sharpening of their shearing edges 75,79. The shape and number of bedknife and shape of the fan blade can vary as to provide maximal efficiency for grass shearing and mulching.

This blow fan with a shearing fan blade 70 and a removable bedknife 76 can be readily installed on a conventional rotor blade type lawn mower or a reel type lawn mower for vacuuming and mulching of grass clippings.

Therefore, the first embodiment having a centrally located transmission box 5 and counter-rotating twin shafts 1,2 with attachments (tines 16,17, and/or auger blades 37 with or without digging bits 38) extending from both sides of the box 5, can be readily adapted to existing power machines for ground tilling and weeding purpose. The second embodiment, with the counter-rotating twin shafts 1,2 mounted on the machine housing 42, can be converted to perform a number of functions simply by replacing different sets of attachments: if tines 16,17 are installed on the twin shafts 1,2, soil tilling can be done; if auger blades 37 with or without digging bits 38 are in place instead, the machine can simultaneously till and remove soil, and for removal of snow if wheels are provided; if the front shaft 1 is installed with a spiked roller 40 and the rear shaft 2, with a shearing reel 41, then the machine can de-thatch and mow grass at the same time, and an additional grass clipping mulching ability can be gained if a fan blower is equipped with a mulching fan blade 70 and a retractable bedknife 76.

What is claimed is:

1. A counter rotating twin shaft gardening system comprising:
    two shafts that are rotatably mounted on a supporting means of a housing, one of said shafts is mounted forward of the other shaft;
    a sliding track wherein one of said shafts is rotatably and slidably held, said sliding track being mounted on said supporting means;
    a spring means for holding one of said shafts located in said track at a predetermined distance from the other shaft whereby a force applied against said one shaft causes it to slide in said track in response to said force such that the distance between shafts is changed and upon release of said force said one shaft is returned to said predetermined distance from said other shaft by said spring means;
    a transmission for driving each of said shafts in a manner that a counter rotation is created between each of said shafts; and
    an engine drive shaft extending into said transmission for coupling to an external drive power source.

2. The counter rotating twin shaft gardening system of claim 1 wherein each of said shafts extends through a shaft sprocket in said transmission; and
    a drive chain is provided interconnecting said engine drive shaft with said shaft sprockets whereby a counter rotation is created between each of said shafts.

3. The counter rotating twin shaft gardening system of claim 1 wherein said engine drive shaft directly drives one of said shafts.

4. The counter rotating twin shaft gardening system of claim 2 wherein said drive chain is tensioned by a tensioner.

5. The counter rotating twin shaft gardening system of claim 1 wherein said engine drive shaft is coupled to the drive shaft of a power source.

6. The counter rotating twin shaft gardening system of claim 1 wherein said engine drive shaft is coupled to the drive shaft of a hand-held power source.

7. The counter rotation twin shaft gardening system of claim 1 wherein said shafts have digging means affixed thereto.

8. The counter rotation twin shaft gardening system of claim 7 wherein said digging or transporting means includes at least one helical auger blade with removable digging bits affixed thereto to dig and transport soil/material.

9. The counter rotation twin shaft system of claim 7 wherein said digging means are self cleaning.

10. The counter rotating twin shaft gardening system of claim 1 wherein one of said shafts has a shearing reel affixed thereto for grass shearing and is rotatably mounted on said housing, said housing comprising bedknife means and wheels for supporting said gardening system.

11. The counter rotating twin shaft gardening system of claim 10 wherein a gear means is provided to reverse the direction of counter-rotation between said shafts.

12. The counter-rotation twin shaft gardening system of claim 10 wherein the other shaft has a spiked roller means affixed thereto for power raking and de-thatching.

13. The counter-rotation twin shaft gardening system of claim 12 wherein said shaft having said spiked roller is in a vertical sliding track and a second spring means for holding said shaft located in said track at a predetermined position.

14. The counter-rotation twin shaft gardening system of claim 12 which includes a comb means for cleaning said spiked roller.

15. The counter-rotation twin shaft gardening system of claim 10 wherein the material of either or both of said shearing reel and bedknife means are impregnated with abrasive matter for self-sharpening.

16. The counter-rotation twin shaft gardening system of claim 10 wherein said spring means also holds a shearing edge of said shearing reel against the shearing edge of said bedknife means.

17. The counter-rotating twin shaft gardening system of claim 10 which includes a fan blower driven to rotate by one of said shafts or said drive chain such that a vacuum is created inside said housing.

18. The counter-rotating twin shaft gardening system of claim 17 wherein said fan blower has straight or "S" shaped blades having shearing edges along its long axis and said shearing edges of said fan blade contact lengthwise with a shearing edge of a fan bedknife for mulching of grass clippings before discharging them to either inside or outside of said housing and said fan bedknife is readily retractable by pulling from said fan blower for de-clogging.

19. The counter-rotating twin shaft gardening system of claim 18 wherein said shearing fan blade and/or said fan bedknife are made of steel impregnated with abrasive materials for self-sharpening.

20. A counter rotating twin shaft gardening system comprising:

two shafts that are rotatably mounted on a supporting means, one of said shafts being mounted forward of the other shaft;

a drive sprocket provided on each of said shafts;

shearing means or digging means directly affixed to at least one of said shafts;

a drive chain contacting the drive sprocket of said forward shaft on a forward side such that said forward shaft rotates in a first direction, said drive chain contacting said drive sprocket of said rearward drive shaft at a rearward side such that said rearward shaft rotates in a direction opposite to said first direction; and an engine drive shaft coupled to an external drive power source for driving said shafts.

* * * * *